United States Patent [19]

Tada et al.

[11] Patent Number: 5,053,475

[45] Date of Patent: Oct. 1, 1991

[54] EPOXY RESIN COMPOSITION

[75] Inventors: Hisashi Tada; Akira Agata, both of Nagoya; Masahiro Saruta, Otake; Takashi Murata, Nagoya; Takatoshi Kubo, Otake, all of Japan

[73] Assignee: Mitsubishi Rayon Co., Ltd., Tokyo, Japan

[21] Appl. No.: 499,343

[22] PCT Filed: Nov. 30, 1988

[86] PCT No.: PCT/JP88/01212

§ 371 Date: Jun. 22, 1990

§ 102(e) Date: Jun. 22, 1990

[87] PCT Pub. No.: WO90/06334

PCT Pub. Date: Jun. 14, 1990

[51] Int. Cl.$^5$ ...................... C08G 59/38; C08G 59/50
[52] U.S. Cl. ......................... 528/98; 528/99; 528/102; 528/103; 528/109
[58] Field of Search ................... 528/98, 99, 102, 103, 528/109

[56] References Cited

U.S. PATENT DOCUMENTS

| | | | |
|---|---|---|---|
| 4,550,129 | 10/1985 | Nir et al. | 528/102 X |
| 4,588,778 | 5/1986 | Nir et al. | 525/115 |
| 4,603,157 | 7/1986 | Asai et al. | 523/440 |
| 4,605,710 | 8/1986 | Guilbert | 528/289 X |
| 4,663,400 | 5/1987 | Wang et al. | 528/97 |
| 4,959,438 | 9/1990 | Tada et al. | 528/98 |

FOREIGN PATENT DOCUMENTS

| | | |
|---|---|---|
| 57-109829 | 7/1982 | Japan . |
| 58-122927 | 7/1983 | Japan . |
| 59-217722 | 12/1984 | Japan . |
| 61-148226 | 7/1986 | Japan . |
| 62-141039 | 6/1987 | Japan . |

Primary Examiner—Earl Nielsen
Attorney, Agent, or Firm—Oblon, Spivak, McClelland, Maier & Neustadt

[57] ABSTRACT

An epoxy resin composition characterized by comprising, as essential components,
(A) a bifunctional epoxy resin,
(B) a trifunctional epoxy resin,
(C) a phenol compound represented by the following formula

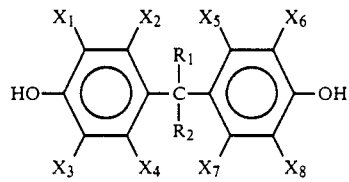

($X_1$ to $X_8$ each represent Br, Cl or H and at least four of $X_1$ to $X_8$ each represent Br or Cl; $R_1$ and $R_2$ each represent H or $CH_3$), and
(D) 4,4'-diaminodiphenyl sulfone or 3,3'-diaminodiphenyl sulfone.

11 Claims, No Drawings

EPOXY RESIN COMPOSITION

TECHNICAL FIELD

The present invention relates to an epoxy resin composition for prepreg having excellent hot wet property and improved compression strength after impact. Composite materials obtained from said resin composition can be used in air planes, automobiles and general industrial applications.

BACKGROUND ART

As the matrix resin for composite material, there have hitherto been widely used epoxy resins for their adhesivity and high rigidity. As the high performance structural matrix resin, in particular, there has been widely used, since 1972, a composition comprising, as main components, N,N,N',N'-tetraglycidyldiaminodiphenylmethane and 4,4'-diaminodiphenyl sulfone.

PROBLEMS TO BE SOLVED BY THE INVENTION

Composite materials obtained from this composition, however, are low in elongation although relatively high in high-temperature compression strength after moisture absorption; accordingly, they have had a draw back that their elongation at break is smaller than recently developed high-elongation reinforcing fibers, for example, a carbon fiber having an elongation at break of 1.5% or more, an aramid fiber and a glass fiber. Also, said composite materials are very low in compression strength after impact and have been completely insufficient for use as a primary structural material. In view of the above, the present inventors made investigation on an epoxy resin composition for prepreg giving a composite material having excellent hot wet property, high utilization as a reinforcing material and improved compression strength after impact and, as a result, have reached the present invention.

MEANS FOR SOLVING THE PROBLEMS

The gist of the present invention is an epoxy resin composition comprising, as essential components, (A) a bifunctional epoxy resin, (B) a trifunctional epoxy resin, (C) a phenol compound represented by the following formula

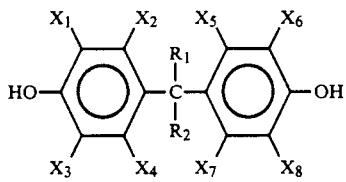

($X_1$ to $X_8$ each represent Br, Cl or H and at least four of $X_1$ to $X_8$ each represent Br or Cl; $R_1$ and $R_2$ each represent H or $CH_3$), and (D) 4,4'-diaminodiphenyl sulfone or 3,3'-diamino diphenyl sulfone.

In these compositions, it is preferable that part or all of (A), all of (B) and all of (C) are subjected to a preliminary reaction to allow 80% or more of the phenolic OH of (C) to undergo a preliminary reaction with the epoxy groups of (A) and (B).

The present invention relates further to an epoxy resin composition comprising the above-mentioned epoxy resin composition and a reinforcing fiber.

As the bifunctional epoxy resin (A) used in the present invention, there can be mentioned glycidyl ether compound derived from bisphenol A, glycidyl ether compound derived from bisphenol F, a brominated epoxy resin obtained by borminating either of them, glycidyl ether compound derived from bisphenol S, etc.

In order to obtain improved toughness, it is preferable to use, in particular, glycidyl ether compound derived from bisphenol A or glycidyl ether compound derived from bisphenol F as a main component. The molar ratio of the component (A) and other epoxy resin (B) is (A)/(B) = 1/0.1 to 1/1.2, preferably 1/0.2 to 1/1.0. When the molar ratio is larger than this range, the resulting epoxy resin composition has reduced heat resistance and reduced chemical resistance; therefore, such a molar ratio is not desirable. When the molar ratio is smaller than the above range, the resulting epoxy resin composition has insufficient toughness and elongation; therefore, such a molar ratio is undesirable.

As the trifunctional epoxy resin (B) used in the present invention, there may be mentioned glycidylamine type epoxy resins, for example, N,N,O-triglycidyl-p or m-aminophenol, N,N,O-triglycidyl-4-amino-m or -5-amino-o-cresol, 1,1,1-(triglycidyloxyphenyl)methane, etc.

Among them, there preferably used N,N,O-triglycidyl-p or m-aminophenol and N,N,O-triglycidyl-4-amino-m- or -5-amino-o-cresol.

As the phenol compound (C) used in the present invention, there can be mentioned tetrabromobisphenol A, tetrabromobisphenol F, octabromobisphenol A, hexabromobisphenol A, etc.

As the curing agent which is the component (D), 4,4'-diaminodiphenyl sulfone is used preferably.

As the reinforcing fiber which is the component (E), there can be mentioned a carbon fiber, a glass fiber, an aramid fiber, a boron fiber, a silicon carbide fiber, etc.

(C) to the epoxy resins (A) and (B) is preferably such that the ratio of epoxy groups/phenolic OH groups is 1/0.1 to 1/0.7. When the phenolic OH groups are larger than 1/0.1, no sufficient water resistance and toughness is obtained, and this is not proper. When they are smaller than 1/0.7, the resulting epoxy resin composition is lower in degree of crosslinking, so sufficient heat resistance and solvent resistance are not obtained, and this is not preferable. They are more preferably 1/0.3 to 1/0.6.

Also, it is preferable that all or part of the epoxy resin (A), all of (B) and all of (C) are subjected to a preliminary reaction to allow 80% or more, more preferably 90% or more of the phenolic OH of (C) to undergo the preliminary reaction. When the reaction proportion is lower than the above, the impact resistance of the resulting resin composition is not improved sufficiently; therefore, it is preferable to effect the preliminary reaction to an extent as mentioned above.

The molar ratio of the epoxy groups of part or all of (A) and all of (B), both used in the preliminary reaction with (C) is (A)/(B) = 1/0.2 to 1/1.4, preferably 1/0.4 to 1/1.2. When the ratio is larger than 1/0.2, no sufficient heat resistance, water resistance and solvent resistance can be obtained; therefore, such a ratio is not preferable. When the ratio is smaller than 1/1.4, gelation occurs during the preliminary reaction; therefore, such a ratio is not preferable.

Further, the ratio of the total epoxy moles and the (C) phenolic OH moles used in the preliminary reaction, i.e. (the total moles of the epoxy groups of (A) and (B) used in the preliminary reaction)/(the moles of the phenolic OH of (C) used in the preliminary reaction) is preferably 1/0.2 to 1/1, more preferably 1/0.3 to 1/0.8. When the ratio is larger than 1/0.2, no sufficient water resistance and toughness can be obtained; therefore, such a ratio is not preferable. When the ratio is smaller than 1/1, the mixture under preliminary reaction becomes too viscous to be handled efficiently.

Meanwhile, the amount of (D) used, relative to (A), (B) and (C) is preferably such that the ratio of the moles obtained by subtracting the moles of the phenolic OH of (C) from the moles of the total epoxy groups and the moles of the NH groups of (D) is 1/0.5 to 1/1.2. When the ratio is larger than 1/0.5, curing is insufficient and solvent resistance and heat resistance of the cured resin are not sufficient. When the ratio is smaller than 1/1.2, water resistance and solvent resistance are reduced.

The resin composition of the present invention may further use, as other components, an inorganic filler, for example, a silica powder, Aerosil and microballons; a flame retardant such as antimony trioxide or the like; a flow controlling agent, for example, a phenol-terminated polyethersulfone, a polysulfone, a poly(vinyl butyrate) and a polyetherimide.

Also, it is possible to use the reinforcing fiber in the form of milled fiber, chopped fiber, unidirectional fiber or fabric.

EXAMPLES

The present invention is explained specifically below by way of Examples. Parts refer to parts by weight.

EXAMPLE 1

100 parts of bisphenol F diglycidyl ether [Epikote 807 (trade name) having an epoxy equivalent of 170, manufactured by Yuka Shell Epoxy K.K.], 18.7 parts of N,N,O-triglycidyl-p-aminophenol (epoxy equivalent: 106) and 41.6 parts of 2,2-bis(3,5-dibromo-4-hydroxyphenyl)propane were mixed at 120° C. The mixture was cooled to 60° C., and 37.9 parts of 4,4'-diaminodiphenyl sulfone and 2.4 parts of a fine powder of silicon oxide (Aerosil 380 manufactured by Nippon Aerosil K.K.) were added. The mixture was sufficiently stirred by a kneader to obtain a resin composition (I). This resin composition (I) was placed between glass plates so as to give a 2-mm plate. Curing was effected at 180° C. for 2 hours to obtain a resin plate. Also, the resin composition (I) was coated on a release paper with a doctor knife under heating at 60° C. to prepare a hot melt film of 78 g/m². A unidirectional prepreg having a fiber areal weight of 145 g/m² and a resin content of 35 wt % was made from the hot melt film and unidirectionally arranged carbon fibers (Pyrofil ®M-1, manufactured by Mitsubishi Rayon K.K.) by a hot melt process This prepreg was stacked to obtain [0°]₁₆ and [+45°/0°/−45°/90]₄ₛ laminates; the laminates were cured in an autoclave of 5 KgG/cm² at 180° C. for 2 hours to obtain composite material panels. They were measured for properties as follows and the results were shown in Table 1.

Hot water resistance of composite material was measured by immersing the composite laminate of [0°]₁₆ in water of 71° C. for 14 days and then subjecting it to a 0° compression test at 82° C. according to ASTM D-3410.

Also, impact resistance was measured by fixing a plate having a panel dimension of 4"×6" on a stand having a hole of 3"×5", dropping a 4.9-kg weight having a nose of ½" R on the center of the plate to apply an impact of 1,500 lb. in per inch of plate thickness, then subjecting the panel to a compression test, according to NASA RP 1092.

Handleability of resin was determined by examing the softness of the resin composition (I) at room temperature. Methyl ethyl ketone resistance (MEK resistance) was determined by immersing a cured resin in methyl ethyl ketone at room temperature for 7 days and then examining the change of its appearance, wherein ○ refers to no change and X refers to big change.

EXAMPLES 2–6, COMPARATIVE EXAMPLES 1–6

The similar experiments to that of Example 1 were conducted by changing the compounding ratio used in Example 1, of Epikote 807, N,N,O-Triglycidyl-p-aminophenol, 2,2-bis(3,5-dibromo-4-hydroxyphenyl)-propane and 4,4'-diaminodiphenyl sulfone. The results were shown in Table 1.

As is appreciated from the results of Table 1, there are proper ranges in A/B epoxy molar ratio, A+B/C (the ratio of the total epoxy moles of A and B and the phenolic OH moles of C) and A+B-C/D (the ratio of the moles obtained by subtracting the phenolic OH moles of C from the total epoxy moles of A and B and the amine NH functional group moles of D).

EXAMPLE 7

A test was effected in the same manner as in Example 1 except that the Epikote 807 used in Example 1 was replaced by a 1:2 weight ratio mixture of Epikote 807 and Epikote 828 (bisphenol A based epoxy resin, trade name manufactured, by Yuka Shall Epoxy K.K., epoxy equivalent: 188). The results were shown in Table 1.

EXAMPLE 8

A test was effected in the same manner as in Example 7 except that the 4,4'-diaminodiphenyl sulfone used as a curing agent in Example 7 was replaced by a 10/1 weight ratio mixture of 4,4'-diaminodiphenyl sulfone and dicyandiamide. The results were shown in Table 1.

EXAMPLES 9–15

Experiments were effected in the same manner as in Example 7 except that the N,N,O-triglycidyl-p-aminophenol used in Example 7 was replaced by N,N,O-triglycidyl-m-aminophenol, N,N,O-triglycidyl-4-amino-m-cresol, N,N,O-triglycidyl-5-amino-o-cresol or 1,1,1-(triglycidyloxyphenyl)methane and there were used various compounding ratios. The results were shown in Table 2.

EXAMPLES 16 and 17

Experiments were effected in the same manner as in Example 1 except that the phenol compound (C) or curing agent (D) used in Example 1 was changed. The results were shown in Table 2.

EXAMPLE 18

There was used the same composition as in Example 1, but Epikote 807 was used by dividing into two parts and subjecting one of these parts to preliminary reaction with component (C) in the following way. 30 Parts of Epikote 807, 18.7 parts of N,N,O-triglycidyl-p-aminophenol and 41.6 parts of 2,2-bis(3,5-dibromo-4-hydroxyphenyl)propane were mixed and heated at 130° C. for 2 hours, and then reaction product was cooled to 60° C. Thereto were added the balance (70 parts) of Epikote 807, 37.9 parts of 4,4'-diaminodiphenyl sulfone and further 2.4 parts of Aerosil 380. The mixture was sufficiently stirred in a kneader (maintained at 60° C.) to obtain a resin composition (II). This composition (II) was made into a resin plate and composites in the same manner as in Example 1 except that the composition (I) of Example 1 was replaced by the composition (II), and the resin plate and the composites were tested in the same manner as in Example 1. The results were shown in Table 3.

EXAMPLES 19–26, COMPARATIVE EXAMPLES 7–11

Experiments were effected in the same manner as in Example 18 except that the mixing ratio of Epikote 807, N,N,O-triglycidyl-p-aminophenol, 2,2-bis(3,5-dibromo-4-hydroxyphenyl)propane and 4,4'-diaminodiphenyl sulfone used in Example 18 was changed. The results were shown in Table 3.

By comparing Example 1 with Examples 18, 23, 24 and 25, it is apparent that in the case of higher consumption of phenolic OH of (C) by preliminary reaction, higher compression strength after impact of the resulting product is achieved.

It is also appreciated that also when there is effected a preliminary reaction, proper ranges exist in A/B epoxy molar ratio, A+B/C (the ratio of the total epoxy moles of A and B used in the preliminary reaction and the phenolic OH moles of C), A+B+A'/C (the ratio of the epoxy total moles used and not used in the preliminary reaction and the phenolic OH moles of C) and A+B+A'-C/D (the ratio of the moles obtained by subjecting the phenolic OH moles of C from the total epoxy moles and the NH functional group moles of amine D).

EXAMPLE 27

A test was effected in the same manner as in Example 18 except that the bifunctional epoxy resin used in the preliminary reaction in Example 18, i.e. Epikote 807 was replaced by Epikote 828. The results were shown in Table 3.

COMPARATIVE EXAMPLE 12

An experiment was effected in the same manner as in Example 1 except that the resin composition (I) used in Example 1 was replaced by a composition obtained by mixing 100 parts of N,N,N',N'-tetraglycidyldiaminobydiphenylmethane and 55 parts of 4,4'-diaminodiphenyl sulfone at 130° C. for 30 minutes. The results were shown in Table 2.

TABLE 1

| | Bifunctional epoxy resin (A) | Trifunctional epoxy resin (B) | Phenol compound (C) | Curing agent (D) | A/B molar ratio |
|---|---|---|---|---|---|
| Example 1 | Epikote 807 | N,N,O-triglycidyl-p-aminophenol | 2,2-Bis(3,5-dibromo-4-hydroxyphenyl)propane | 4,4'-Diaminodiphenyl sulfone | 1/0.3 |
| Example 2 | " | N,N,O-triglycidyl-p-aminophenol | 2,2-Bis(3,5-dibromo-4-hydroxyphenyl)propane | 4,4'-Diaminodiphenyl sulfone | 1/0.8 |
| Example 3 | " | N,N,O-triglycidyl-p-aminophenol | 2,2-Bis(3,5-dibromo-4-hydroxyphenyl)propane | 4,4'-Diaminodiphenyl sulfone | 1/0.3 |
| Example 4 | " | N,N,O-triglycidyl-p-aminophenol | 2,2-Bis(3,5-dibromo-4-hydroxyphenyl)propane | 4,4'-Diaminodiphenyl sulfone | 1/0.8 |
| Example 5 | " | N,N,O-triglycidyl-p-aminophenol | 2,2-Bis(3,5-dibromo-4-hydroxyphenyl)propane | 4,4'-Diaminodiphenyl sulfone | 1/0.3 |
| Example 6 | " | N,N,O-triglycidyl-p-aminophenol | 2,2-Bis(3,5-dibromo-4-hydroxyphenyl)propane | 4,4'-Diaminodiphenyl sulfone | 1/0.3 |
| Comparative Example 1 | " | N,N,O-triglycidyl-p-aminophenol | 2,2-Bis(3,5-dibromo-4-hydroxyphenyl)propane | 4,4'-Diaminodiphenyl sulfone | 1/0.05 |
| Comparative Example 2 | " | N,N,O-triglycidyl-p-aminophenol | 2,2-Bis(3,5-dibromo-4-hydroxyphenyl)propane | 4,4'-Diaminodiphenyl sulfone | 1/1.3 |
| Comparative Example 3 | " | N,N,O-triglycidyl-p-aminophenol | 2,2-Bis(3,5-dibromo-4-hydroxyphenyl)propane | 4,4'-Diaminodiphenyl sulfone | 1/0.3 |
| Comparative Example 4 | " | N,N,O-triglycidyl-p-aminophenol | 2,2-Bis(3,5-dibromo-4-hydroxyphenyl)propane | 4,4'-Diaminodiphenyl sulfone | 1/0.3 |
| Comparative Example 5 | " | N,N,O-triglycidyl-p-aminophenol | 2,2-Bis(3,5-dibromo-4-hydroxyphenyl)propane | 4,4'-Diaminodiphenyl sulfone | 1/0.3 |
| Comparative Example 6 | " | N,N,O-triglycidyl-p-aminophenol | 2,2-Bis(3,5-dibromo-4-hydroxyphenyl)propane | 4,4'-Diaminodiphenyl sulfone | 1/0.3 |
| Example 7 | 2/1 Weight ratio mixture of Epikote 807 and Epikote 828 | N,N,O-triglycidyl-p-aminophenol | 2,2-Bis(3,5-dibromo-4-hydroxyphenyl)propane | 4,4'-Diaminodiphenyl sulfone | 1/0.6 |
| Example 8 | 2/1 Weight ratio mixture of Epikote 807 and Epikote 828 | N,N,O-triglycidyl-p-aminophenol | 2,2-Bis(3,5-dibromo-4-hydroxyphenyl)propane | 10/1 Weight ratio mixture of 4,4'-diamino-diphenyl sulfone and | 1/0.6 |

TABLE 1-continued

|  | A + B/C molar ratio | A + B − C/D molar ratio | Handle-ability | MEK resis-tance | dicyandiamide 0° Compression strength after water absorption 82° C. (Kg/mm$^2$) | Compression strength after impact room temperature (Kg/mm$^2$) |
|---|---|---|---|---|---|---|
| Example 1 | 1/0.2 | 1/1 | ○ | ○ | 110 | 31 |
| Example 2 | 1/0.2 | 1/1 | ○ | ○ | 120 | 28 |
| Example 3 | 1/0.5 | 1/1 | ○ | ○ | 113 | 33 |
| Example 4 | 1/0.5 | 1/1 | ○ | ○ | 125 | 33 |
| Example 5 | 1/0.2 | 1/1.1 | ○ | ○ | 112 | 28 |
| Example 6 | 1/0.2 | 1/0.7 | ○ | ○ | 121 | 26 |
| Comparative Example 1 | 1/0.2 | 1/1 | ○ | X | 85 | 26 |
| Comparative Example 2 | 1/0.2 | 1/1 | ○ | ○ | 125 | 21 |
| Comparative Example 3 | 1/0.05 | 1/1 | ○ | ○ | 110 | 19 |
| Comparative Example 4 | 1/0.8 | 1/1 | X | ○ | — | — |
| Comparative Example 5 | 1/0.2 | 1/0.4 | ○ | X | 70 | 16 |
| Comparative Example 6 | 1/0.2 | 1/1.3 | ○ | X | 80 | 34 |
| Example 7 | 1/0.25 | 1/1 | ○ | ○ | 115 | 30 |
| Example 8 | 1/0.25 | 1/1 | ○ | ○ | 120 | 31 |

TABLE 2

|  | Bifunctional epoxy resin (A) | Trifunctional epoxy resin (B) | Phenol compound (C) | Curing agent (D) | A/B molar ratio |
|---|---|---|---|---|---|
| Example 9 | 2/1 Weight ratio mixture of Epikote 807 and Epikote 828 | N,N,O-triglycidyl-m-aminophenol | 2,2-Bis(3,5-dibromo-4-hydroxyphenyl)-propane | 4,4'-Diamino-diphenyl sulfone | 1/0.6 |
| Example 10 | 2/1 Weight ratio mixture of Epikote 807 and Epikote 828 | N,N,O-triglycidyl-m-aminophenol | 2,2-Bis(3,5-dibromo-4-hydroxyphenyl)-propane | 4,4'-Diamino-diphenyl sulfone | 1/0.8 |
| Example 11 | 2/1 Weight ratio mixture of Epikote 807 and Epikote 828 | N,N,O-triglycidyl-4-amino-m-cresol | 2,2-Bis(3,5-dibromo-4-hydroxyphenyl)-propane | 4,4'-Diamino-diphenyl sulfone | 1/0.6 |
| Example 12 | 2/1 Weight ratio mixture of Epikote 807 and Epikote 828 | N,N,O-triglycidyl-4-amino-m-cresol | 2,2-Bis(3,5-dibromo-4-hydroxyphenyl)-propane | 4,4'-Diamino-diphenyl sulfone | 1/0.8 |
| Example 13 | 2/1 Weight ratio mixture of Epikote 807 and Epikote 828 | N,N,O-triglycidyl-5-amino-o-cresol | 2,2-Bis(3,5-dibromo-4-hydroxyphenyl)-propane | 4,4'-Diamino-diphenyl sulfone | 1/0.6 |
| Example 14 | 2/1 Weight ratio mixture of Epikote 807 and Epikote 828 | N,N,O-triglycidyl-5-amino-o-cresol | 2,2-Bis(3,5-dibromo-4-hydroxyphenyl)-propane | 4,4'-Diamino-diphenyl sulfone | 1.0.8 |
| Example 15 | 2/1 Weight ratio mixture of Epikote 807 and Epikote 828 | 1,1,1-(triglycidyl-oxyphenyl)methane | 2,2-Bis(3,5-dibromo-4-hydroxyphenyl)-propane | 4,4'-Diamino-diphenyl sulfone | 1/0.6 |
| Example 16 | Epikote 807 | N,N,O-triglycidyl-p-aminophenol | 2,2-Bis(2,3,5,6-tetrabromo-4-hydroxyphenyl)-propane | 4,4'-Diamino-diphenyl sulfone | 1/0.3 |
| Example 17 | Epikote 807 | N,N,O-triglycidyl-p-aminophenol | 2,2-Bis(3,5-dibromo-4-hydroxyphenyl)propane | 3,3'-Diamino-diphenyl sulfone | 1/0.3 |
| Comparative Example 12 | — | N,N,N'-N'-tetra-glycidyldiamino-diphenylmethane | — | 4,4'-Diamino-diphenyl sulfone | — |

|  | A + B/C molar ratio | A + B − C/D molar ratio | Handle-ability | MEK resis-tance | 0° Compression strength after water absorption 82° C. (Kg/mm$^2$) | Compression strength after impact room temperature (Kg/mm$^2$) |
|---|---|---|---|---|---|---|
| Example 9 | 1/0.25 | 1/1 | ○ | ○ | 120 | 34 |
| Example 10 | 1/0.5 | 1/1 | ○ | ○ | 130 | 37 |
| Example 11 | 1/0.25 | 1/1 | ○ | ○ | 125 | 35 |
| Example 12 | 1/0.5 | 1/1 | ○ | ○ | 135 | 39 |
| Example 13 | 1/0.25 | 1/1 | ○ | ○ | 122 | 34 |
| Example 14 | 1/0.5 | 1/1 | ○ | ○ | 132 | 38 |

TABLE 2-continued

| | | | | | | |
|---|---|---|---|---|---|---|
| Example 15 | 1/0.25 | 1/1 | ○ | ○ | 110 | 32 |
| Example 16 | 1/0.2 | 1/1 | ○ | ○ | 120 | 36 |
| Example 17 | 1/0.2 | 1/1 | ○ | ○ | 113 | 35 |
| Comparative Example 12 | — | 1/1 | ○ | ○ | 130 | 15 |

TABLE 3

| | Composition subjected to preliminary reaction | | | Composition not subjected to preliminary reaction | | A/B molar ratio | A + B/C molar ratio |
|---|---|---|---|---|---|---|---|
| | Bifunctional epoxy resin (A) | Trifunctional epoxy resin (B) | Phenol compound (C) | Bifunctional epoxy resin (A) | Curing agent (D) | | |
| Example 18 | Epikote 807 | N,N,O-triglycidyl-p-aminophenol | 2,2-Bis(3,5-dibromo-4-hydroxyphenyl)-propane | Epikote 807 | 4,4'-Diaminodiphenylsulfone | 1/1 | 1/0.43 |
| Example 19 | " | N,N,O-triglycidyl-p-aminophenol | 2,2-Bis(3,5-dibromo-4-hydroxyphenyl)-propane | " | 4,4'-Diaminodiphenylsulfone | 1/1.2 | 1/0.43 |
| Example 20 | " | N,N,O-triglycidyl-p-aminophenol | 2,2-Bis(3,5-dibromo-4-hydroxyphenyl)-propane | " | 4,4'-Diaminodiphenylsulfone | 1/0.5 | 1/0.43 |
| Comparative Example 7 | " | N,N,O-triglycidyl-p-aminophenol | 2,2-Bis(3,5-dibromo-4-hydroxyphenyl)-propane | " | 4,4'-Diaminodiphenylsulfone | 1/0.1 | 1/0.43 |
| Comparative Example 8 | " | N,N,O-triglycidyl-p-aminophenol | 2,2-Bis(3,5-dibromo-4-hydroxyphenyl)-propane | " | 4,4'-Diaminodiphenylsulfone | 1/1.5 | 1/0.43 |
| Example 21 | " | N,N,O-triglycidyl-p-aminophenol | 2,2-Bis(3,5-dibromo-4-hydroxyphenyl)-propane | " | 4,4'-Diaminodiphenylsulfone | 1/1 | 1/0.3 |
| Example 22 | " | N,N,O-triglycidyl-p-aminophenol | 2,2-Bis(3,5-dibromo-4-hydroxyphenyl)-propane | " | 4,4'-Diaminodiphenylsulfone | 1/1 | 1/0.8 |
| Comparative Example 9 | " | N,N,O-triglycidyl-p-aminophenol | 2,2-Bis(3,5-dibromo-4-hydroxyphenyl)-propane | " | 4,4'-Diaminodiphenylsulfone | 1/1 | 1/0.17 |
| Comparative Example 10 | " | N,N,O-triglycidyl-p-aminophenol | 2,2-Bis(3,5-dibromo-4-hydroxyphenyl)-propane | " | 4,4'-Diaminodiphenylsulfone | 1/1 | 1/1.1 |
| Example 23 | " | N,N,O-triglycidyl-p-aminophenol | 2,2-Bis(3,5-dibromo-4-hydroxyphenyl)-propane | " | 4,4'-Diaminodiphenylsulfone | 1/1 | 1/0.43 |
| Example 24 | " | N,N,O-triglycidyl-p-aminophenol | 2,2-Bis(3,5-dibromo-4-hydroxyphenyl)-propane | " | 4,4'-Diaminodiphenylsulfone | 1/1 | 1/0.43 |
| Example 25 | " | N,N,O-triglycidyl-p-aminophenol | 2,2-Bis(3,5-dibromo-4-hydroxyphenyl)-propane | " | 4,4'-Diaminodiphenylsulfone | 1/1 | 1/0.43 |
| Example 26 | " | N,N,O-triglycidyl-p-aminophenol | 2,2-Bis(3,5-dibromo-4-hydroxyphenyl)-propane | " | 4,4'-Diaminodiphenylsulfone | 1/1 | 1/0.6 |
| Comparative Example 11 | " | N,N,O-triglycidyl-p-aminophenol | 2,2-Bis(3,5-dibromo-4-hydroxyphenyl)-propane | " | 4,4'-Diaminodiphenylsulfone | 1/1 | 1/0.9 |
| Example 27 | Epikote 828 | N,N,O-triglycidyl-p-aminophenol | 2,2-Bis(3,5-dibromo-4-hydroxyphenyl)-propane | " | 4,4'-Diaminodiphenylsulfone | 1/1 | 1/0.43 |

| | A + B/C preliminary reaction conditions and conversion | A + B + A'/C molar ratio | A + B + A'-C/D molar ratio | Handleability | MEK resistance | 0° compression strength after water absorption 82° C. (Kg/mm²) | Compression strength after impact room temperature (Kg/mm²) |
|---|---|---|---|---|---|---|---|
| Example 18 | 130° C. × 2 hr (95%) | 1/0.2 | 1/1 | ○ | ○ | 115 | 35 |

TABLE 3-continued

| | | | | | | | |
|---|---|---|---|---|---|---|---|
| Example 19 | 130° C. × 2 hr (95%) | 1/0.2 | 1/1 | ○ | ○ | 120 | 33 |
| Example 20 | 130° C. × 2 hr (95%) | 1/0.2 | 1/1 | ○ | ○ | 107 | 37 |
| Comparative Example 7 | 130° C. × 2 hr (95%) | 1/0.2 | 1/1 | ○ | X | 85 | 36 |
| Comparative Example 8 | 130° C. × 2 hr (95%) | 1/0.2 | 1/1 | X | ○ | 130 | 21 |
| Example 21 | 130° C. × 2 hr (95%) | 1/0.2 | 1/1 | ○ | ○ | 113 | 32 |
| Example 22 | 130° C. × 2 hr (95%) | 1/0.2 | 1/1 | ○ | ○ | 120 | 37 |
| Comparative Example 9 | 130° C. × 2 hr (95%) | 1/0.15 | 1/1 | ○ | ○ | 100 | 22 |
| Comparative Example 10 | 130° C. × 2 hr (95%) | 1/0.2 | 1/1 | X | ○ | 120 | 35 |
| Example 23 | 130° C. × 3 hr (98%) | 1/0.2 | 1/1 | ○ | ○ | 120 | 35 |
| Example 24 | 130° C. × 1 hr (70%) | 1/0.2 | 1/1 | ○ | ○ | 115 | 33 |
| Example 25 | 130° C. × 30 min (20%) | 1/0.2 | 1/1 | ○ | ○ | 110 | 31 |
| Example 26 | 130° C. × 2 hr (95%) | 1/0.5 | 1/1 | ○ | ○ | 120 | 37 |
| Comparative Example 11 | 130° C. × 2 hr (95%) | 1/0.8 | 1/1 | X | ○ | 121 | 35 |
| Example 27 | 130° C. × 2 hr (95%) | 1/0.2 | 1/1 | ○ | ○ | 117 | 34 |

We claim:

1. An epoxy resin composition characterized by comprising the following components (A), (B), (C) and (D) as essential components:
   (A) a bifunctional epoxy resin,
   (B) a trifunctional epoxy resin,
   (C) a phenol compound represented by the formula

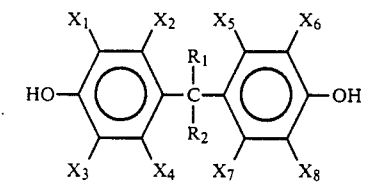

($X_1$ to $X_8$ each represent Br, Cl or H and at least four of $X_1$ to $X_8$ each represent Br or Cl; $R_1$ and $R_2$ each represent H or $CH_3$), and
   (D) 4,4'-diaminodiphenyl sulfone or 3,3'-diaminodiphenyl sulfone.

2. A composition according to claim 1, characterized in that the bifunctional epoxy resin (A) is glycidyl ether compound derived from bisphenol A or glycidyl ether compound from bisphenol F.

3. A composition according to claim 1, characterized in that the trifunctional epoxy resin (B) is one of N,N,O-triglycidyl-p- or m-aminophenol, 1,1,1-(triglycidyloxyphenyl)methane, N,N,O-triglycidyl-4-amino-m- or 5-amino-o-cresol, or a mixture of two or more of them.

4. A composition according to claim 1, characterized in that tetrabromobisphenol A is used as the component (C).

5. A composition according to claim 1, characterized in that the molar ratio of the epoxy groups of (A)/(B) is 1/0.1 to 1/1.2, preferably 1/0.2 to 1/1.0.

6. A composition according to claim 1, characterized in that the amount of (C) used is such that the ratio of the phenolic OH of (C) to the epoxy groups of (A) and (B) is 1/0.1 to 1/0.7.

7. A composition according to claim 1, characterized in that the amount of (D) used is such that the ratio of the moles obtained by subtracting the moles of the phenolic OH groups of (C) from the moles of the epoxy groups of (A) and (B) and the moles of the NH groups of (D) is 1/0.5 to 1/1.2.

8. A composition according to claim 1, characterized in that all or part of (A) is mixed with all of (B) and the resulting mixture and all of (C) are subjected to a preliminary reaction to allow 80% or more of the phenolic OH of (C) to undergo the preliminary reaction.

9. A composition according to claim 8, characterized in that the molar ratio of the epoxy groups of (A)/(B) used in the preliminary reaction is 1/0.2 to 1/1.4 and the amount of (C) used is such that the molar ratio of the total moles of the epoxy groups of (A) and (B) and the moles of the phenolic OH of (C) is 0.2 to 1/1.

10. A composition according to claim 1, characterized in that the amount of (D) used is such that the ratio of the moles obtained by subjecting the moles of the phenolic OH groups of (C) from the moles of the epoxy groups of all of (A) and all of (B) and the moles of the NH groups of (D) is 1/0.5 to 1/1.2.

11. An epoxy resin composition characterized by comprising the following components (A), (B), (C), (D) and (E) as essential components:
    (A) a bifunctional epoxy resin,
    (B) a trifunctional epoxy resin,
    (C) a phenol compound represented by the following formula

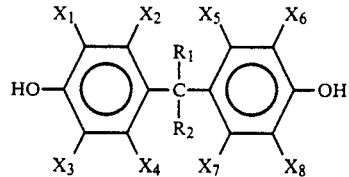

($X_1$ to $X_8$ each represent Br, Cl or H and at least four of $X_1$ to $X_8$ each represent Br or Cl; $R_1$ and $R_2$ each represent H or $CH_3$),
    (D) 4,4'-diaminodiphenyl sulfone or 3,3'-diaminodiphenyl sulfone, and
    (E) a reinforcing fiber.

* * * * *